Oct. 15, 1946.                D. M. BORDEN                2,409,533
                APPARATUS FOR CONTROLLING SUPERCHARGERS
                Filed Jan. 19, 1944              2 Sheets-Sheet 1
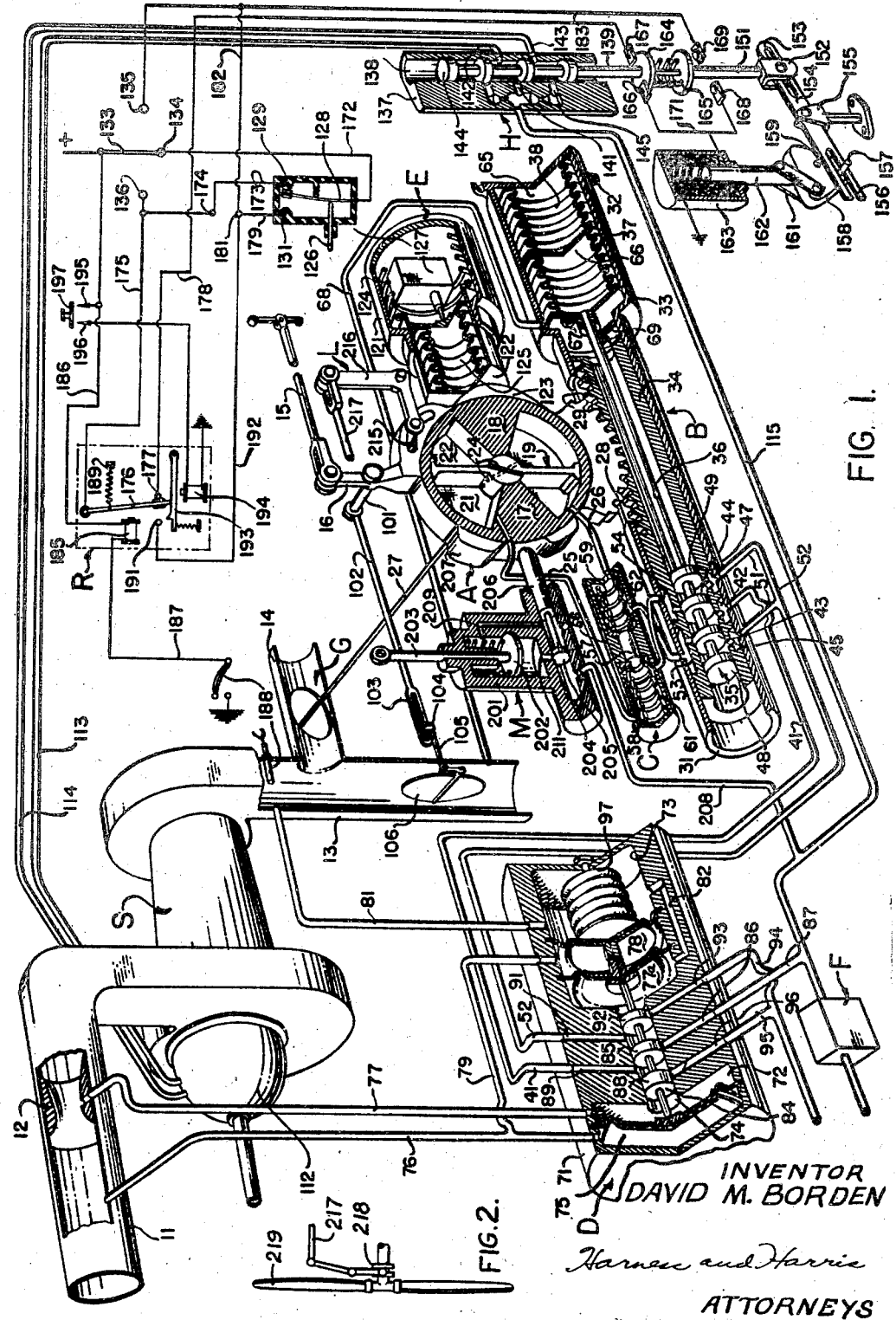
INVENTOR
DAVID M. BORDEN
Harness and Harris
ATTORNEYS

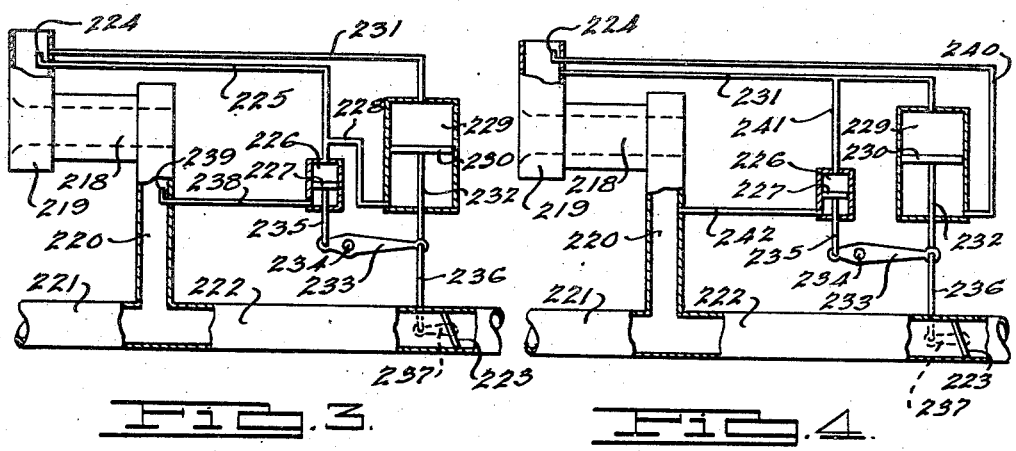
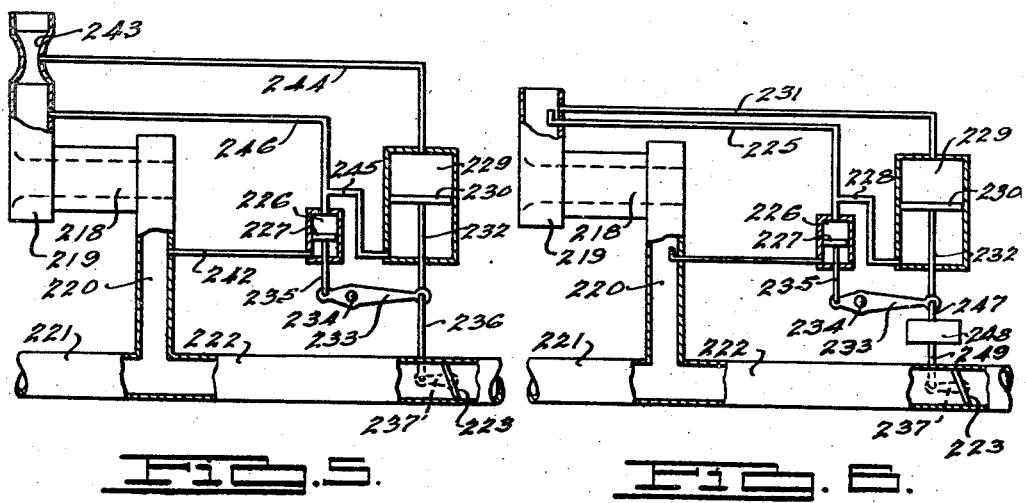

Patented Oct. 15, 1946

2,409,533

UNITED STATES PATENT OFFICE 2,409,533

APPARATUS FOR CONTROLLING SUPERCHARGERS

David M. Borden, Royal Oak, Mich., assignor to Chrysler Corporation, Highland Park, Mich., a corporation of Delaware Application January 19, 1944, Serial No. 518,829

16 Claims. (Cl. 230—115)

This application is a continuation-in-part of copending application Serial No. 480,786, filed March 27, 1943, in the names of Henry S. Gilfillan, David M. Borden and Paul W. Wyckoff. This application relates broadly to a means employed for keeping a supercharger within the pumping limit. Broadly these means respond to a condition of operation in which pressure increase in the supercharger becomes greater than a constant times the velocity head of the gas entering the supercharger. The means shown in the Fig. 1 and grouped under D for carrying this out is claimed specifically in the copending application of Henry W. Gilfillan, Serial No. 480,786, filed March 27, 1943. This means is claimed broadly in the present application. Also means for this same purpose shown in Figs. 3 to 6 is claimed in the present application.

This invention relates to apparatus for controlling the power plant in an aircraft, and it has particular reference to a control system in which a number of co-related functions governing the operation of the power plant are subjected to an integrated manual and automatic control.

As herein employed, the term "power plant" embraces the internal combustion engine proper, the propeller connected to the engine, and the supercharger which compresses the relatively rare air for delivery with the fuel to the engine inlet manifold. These units are often interconnected by gearing for simultaneous rotation. For satisfactory performance, it is necessary to correlate a number of variables, such as engine or propeller speed, the amount of fuel mixture and the proportions of air and fuel in such mixture delivered to the engine, the actual speed of the supercharger and its ratio to the engine speed, and the pressure at which the fuel mixture is supplied. The wide variations in speed and power loads on the engine, and the variations in the air supply due to changes in density and temperature with changes in altitude, coupled with the incidents of flight service, make the integration and resolution of these variables an extremely difficult task. Independent manual adjustments, made by the pilot or crew in response to indicating dial readings, are too dependent on human frailties and preoccupations to be satisfactory, especially when the plane participates in aerial combat. Accordingly, a coordinated control system, subject in some respects to the pilot's supervision, but otherwise as automatic in its reactions as may be, is indicated.

The present invention contemplates such a combined manual and automatic control system, wherein the pilot, by manual settings of a control lever, may approximate a satisfactory coordination of the several variables, and wherein automatic mechanism, responsive to such variables or changes therein, will be brought into action to make such further adjustments as conditions warrant.

In a general or comprehensive aspect, the invention looks forward to the simultaneous control of: the discharge pressure at the supercharger and its restrictions to values within those imposed by the pumping limit; the supercharger speed; the engine speed and its ratio to the supercharger speed; and the richness of the fuel mixture supplied to the engine inlet manifold. As will be made to appear from the following portions of this description and the appended claims, numerous sub-combinations of this control system may be employed to advantage without inclusion of other parts, while further controls may, if desired, be superimposed on those herein specifically considered.

It will have been observed that use has been made of the term, "pumping limit." When the characteristic curve for a supercharger, operating at some designated speed, is plotted, it is readily noticeable that a point is reached where further reductions in the quantity of air passing through the machine fail to produce proportionate increases in the difference between the delivery and inlet pressures. This point is sometimes called the surge point, and, with respect to axial flow compressors, its existence may be explained by considering the character of flow through the supercharger. Too low a velocity of the air, with respect to the rotational speed of the blades and their formation, causes the air to meet the blades at too great an angle of attack, aerodynamic flow is interrupted and the machine stalls. This condition produces noises and vibrations and pulsations which may cause physical failure of the parts, with attendant disruption of the entire power plant. Accordingly, operation of the supercharger at or beyond the surge point is to be avoided.

On the other hand, the supercharger has the duty of supplying to the engine that quantity of air, under suitable pressure, which is needed under its wide range of operating speeds and horsepower demands. Since the aircraft operates from sea level to very high altitudes, it is apparent that the density, and therefore the mass, of inducted air is also a variable. Presupposing a supercharger designed to supply enough low density air, compressed to a suitable pressure, for an open throttle condition of the engine, then the same supercharger may not operate effectively with denser air at the same speed, nor with the same rarefied air at a lower speed, since a change in either of these factors may adversely affect the angle of attack.

When the surge points for the same supercharger, subjected to changes in these variables, are plotted, it is found that they lie in or along another curve, which establishes the "pumping limit" for the supercharger throughout the range of operating conditions which it may encounter. In practice, it means that a certain relationship must be maintained between the pressure rise through the machine, and the quantity of air which passes through the supercharger. Mathematically, the relationship may be expressed, with sufficient accuracy for present purposes, by a simple equation in this form:

$$P_2 - P_1 = K \tfrac{1}{2} \rho v^2 + K' P_2$$

where $P_2$ is the pressure of the discharged air; $P_1$ is the inlet or barometric pressure; $\rho$ is the density of the inducted air; $v$ its velocity; and $K$, $K'$, are constants.

In one aspect, this invention contemplates a control system in which the supercharger is made to operate within the pumping limit. The principles and means hereinafter discussed in detail will disclose how such result is obtained.

An object of the present invention is to provide means for causing a supercharger to operate within its pumping limit.

Among others, the present invention has as an object the control and regulation of a spill valve or waste gate connected to the supercharger delivery line, so that the quantity and pressure of the air may be maintained at a suitable value.

Other objects include the provision of means to govern the speed ratio between the supercharger and the engine; the speed of the engine in relation to the torque demand of the propeller; and the supply of either a rich or lean fuel mixture to the engine.

Further objects contemplate the devising of automatic mechanism and means for carrying out the general objectives, including dampening devices, and safety features, insuring the proper functioning of the system.

Additional objects, and the advantages to be derived from the practice of the invention, both in its entirety or by use of its several components, will become apparent from a perusal of the following description of a preferred embodiment, read in connection with the accompanying drawings.

In the drawings,

Fig. 1 shows, partially in sectional perspective and partially in conventional diagram, a control system embodying the principles of the invention, and presently preferred mechanism for applying the same in practice;

Fig. 2 shows an airplane propeller and pitch control therefor;

Fig. 3 shows diagrammatically a first modified form for establishing pumping limit control;

Fig. 4 shows diagrammatically a second modified form of the same;

Fig. 5 shows diagrammatically a third modified form of the same;

Fig. 6 shows diagrammatically a fourth modified form of the same.

For the purposes of clarity and simplicity, there are omitted from the drawings representations of various standard parts, accessories, and design details, since these, as such, form no part of the present invention and are here unnecessary for a full presentation of the subject to those skilled in the art. For like reasons, no attempt has been made to illustrate an airplane engine, nor the details of a supercharger, nor the mechanism interconnecting the same.

In approaching a consideration of the drawings, it may be initially helpful to designate certain of the units by reference letters, the details of which will be presented hereinafter. The unit A is a rotary member manually operable by the pilot into various positions and, the automatic control features are, to a large extent, governed by the setting of this control instrumentality.

The unit B is a valve including member, manually operable by reason of its connection to the unit A, and further subject to automatic adjustment. The unit C is a valve device responsive to excess changes in the pressure conditions occurring therein. The three units A, B, and C operate conjunctively with a supply of hydraulic pressure fluid entering the units through a filter F, and in such manner as to establish the position of a waste gate or spill valve G positioned in the supercharger delivery line. These units, therefore, modulate the discharge pressure of the supercharger, which is designated by the reference letter S.

The unit D at the left of Fig. 1 is a pumping limit detector whose function it is to supervise, and even to overrule, the decisions made by the foregoing units in connection with the setting of the valve G. In other words, the detector D insures the operation of the supercharger S within its pumping limit. The unit E, on the right hand side of the control rotor A, is provided to govern the speed ratio between the supercharger S and the engine (not shown). With this unit is associated a solenoid control valve H and electrical circuits illustrated diagrammatically at the upper right of the figure. The unit M is a mechanism provided to adjust the fuel mixture and it is also responsive to the setting of the rotor A. The linkage L, also connected to the rotor A, is connected at its opposite end to the propeller governor of the engine in such manner as to govern the speed of the engine, as shown in Fig. 2.

*Supercharger discharge pressure regulation*

Air enters the supercharger S through an inlet line 11, flowing through a venturi 12 and thence into the inlet of the supercharger for delivery into a line 13 which is connected to the engine inlet manifold at a point not shown. The line 13 is provided with a lateral or spill pipe 14 in which is rotatably mounted the waste gate or spill valve G. An open position of the valve G permits the supercharger discharge to bleed to the atmosphere, a closed position of the valve G directs all of the discharge to the engine manifold, and intermediate positions of the valve permit proportionate withdrawals of the compressed air, either to diminish its quantity or its pressure.

The system is such that the pilot may manually position the gate G. For this purpose a link 15, operable from the pilot's position, is connected by a clevis to a radial arm 16 extending from the outer surface of the unit A. The unit A comprises a pivotally mounted rotatable member having a plurality of cams formed on its external periphery, and internally divided into two chambers by means of inwardly extending sectors 17 and 18. These are cut away at the center to receive a diametrically extending vane 19, rotatable within and with respect to the casing of the rotor A. There are thus formed pairs of opposed chambers 21 and 22, the chambers in each pair being connected by holes 24 diagonally drilled through the hub of the vane 19. The several chambers 21 and 22 are flooded with hydraulic pressure fluid admitted from a suitable source through the oil filter F and normally blocked off from free flow by valve mechanism hereinafter described. Admission or withdrawal of the pressure fluid to the chambers is effected by piping 25 and 26 entering the pairs of chambers through ducts formed in the rotor casing wall. The vane 19 is, of course, rotatably pivoted for motion relative to the rotor casing, and the unit as illustrated is also provided with a cover plate in order to close the chambers and preclude oil leakage.

It will be observed that, with the parts in the position illustrated, a left hand movement of the link 15 will effect a counterclockwise rotation of the rotor A. Since it has been assumed that the chambers 21 and 22 are blocked against flow of oil, then such movement will drag the vane 19 also in a counterclockwise direction to rotate an attached shaft 27 upon which is mounted the gate valve G. Counterlockwise rotation of the valve will close the lateral 14, and thereby operate to build up rapidly the pressure in the engine inlet line 13. Conversely, clockwise rotation of the unit A would, under the same blocked condition for the vane 19, open the valve G to its limiting position. A gear segment 28 is formed on the lower external portion of the rotor A and its teeth engage with a rack 29 included in the unit B.

This unit comprises a stationary cylindrical housing 31 (note, for example, the securing lugs 32 at the extreme right). The cylinder 31 is suitably cut away at its mid portion to permit engagement of the teeth of the gear and rack 28 and 29, while the right hand portion 33 is enlarged. Within the bore of the cylinder 31 is a longitudinally movable sleeve 34 having on its external surface the rack 29. The sleeve 34 in turn receives a valve unit 35 provided with a stem 36 which extends to the right hand section 33 where it is coupled with a bellows assembly including the bellows 37 and 38. The left hand section of the sliding sleeve 34 is provided with ports and fluid pressure line connections adapted to be opened or closed by relative movement of the valve 35.

Pressure fluid is admitted to the unit B through a pressure line 41 into an inlet chamber 42 connected to the clear space between the valve discs 43 and 44. Similar ports 45 and 47 are provided for normal connection to the space between discs 43 and 48 and 44 and 49 respectively. These last mentioned ports are coupled together by tubes 51 which in turn are connected to a drain line 52. The sleeve 34 is also provided, at a radially remote region, with two additional ports 53 and 54. These ports are normally covered by the valve discs 43 and 44. Thus, in the position shown, pressure fluid may enter the region between the discs 43 and 44 via the port 42, but it cannot go anywhere because the exit ports 53 and 54 are blocked by these discs.

The ports 53 and 54 are connected by suitable tubing to oppose chambers formed within the casing of the unit C. This casing has a central shoulder portion 56 receiving a piston 57 which is normally maintained in its centralized position by the hydraulic pressure exerted on its ends, which are in communication with the opposed chambers 58 and 59. Each chamber also receives a spring 61. The chamber 58 is connected to the chambers 21 of the unit A by the above mentioned piping 25, while the chambers 22 are connected to the chamber 59 by the piping 26. Since, as previously noted, ports 53 and 54 of the unit B are normally blocked by the valve discs 43 and 44, it will now be apparent why there can be no displacement of the pressure fluid in the chambers 21 and 22, and why the vane 19 must, under these conditions, turn with the unit A.

However, while initial rotation of the manually operable rotor A causes the valve G to shift, due to the drag on the vane 19, rotation of the unit A (in a counterclockwise direction, for example) also draws the longitudinally movable sleeve 34 to the right, due to the intermeshing of the segment 28 with the rack 29. This motion connects the port 53 with the port 42, and the port 54 with the port 47. Accordingly, pressure fluid may now flow through the line 41, ports 42 and 53, chamber 59, and line 26, to the pair of chambers 22. The chambers 21 are concurrently connected to the drain line 52 through the piping 25, chamber 58, ports 54 and 47, and lateral 51. Hydraulic pressure is now applied through the chambers 22 to cause the vane 19 to move in a counterclockwise direction to its limiting position, or, the movement of the rotor A brings into play mechanism causing the rotor 19 to overtravel.

Conversely, if the rotor A were rotated in a clockwise direction, as by pulling the link 15 to the right, then the sleeve 34 would be shifted to the left. The flow into and away from the rotor would now be reversed, admission being effected through the ports 42 and 54, and discharge occurring through the ports 53 and 45. The remainder of the circuits is the same as heretofore noted. Too rapid overtravel of the vane 19 in either rotational direction is forestalled, however, by the operation of the stabilizing unit C. A rapid increase in pressure in either chamber 58 or 59, coupled with a sudden release of hydraulic pressure in the opposite chamber, creates momentarily a substantial pressure differential on the opposite ends of the piston 57. This pressure differential, therefore, drives the piston into one chamber or the other, to close, by means of abutting valve discs 62, one or the other of the connections to the ports 53 or 54. Accordingly, the outwardly flowing oil develops a back pressure in the discharging chambers 21 or 22, and in this way prevents the vane 19 from going to its extreme position too rapidly. Obviously, the action of the piston 57 is the same, except for its direction of motion, irrespective of the application of the hydraulic pressure to either side of the vane member 19. Accordingly, the valve G will initially move to that position determined by the manual setting of the control unit A and will thereafter tend to creep forward to its limiting position.

Opposition to overtravel, and restoration of the valve G to a suitable position, is effected through the bellows assembly contained in the right hand section 33 of the unit B. The bellows 38 is secured at one end to the wall 65, and, at its opposite end, it is joined to the bellows 37, being sealed therefrom by the disc 66. Before sealing, the bellows 38 is evacuated to a very low or negative gauge pressure. The bellows 37, which is free to float in the casing 33, is connected at its opposite end to the valve stem 36, and it is also provided with a vent 67 of small diameter. The space between the bellows and the inner wall of the casing 33 is connected to the supercharger discharge line 13 by a conduit 68. An end wall 69, positioned between the casing 33 and the sleeve 34, and formed with a suitable gland to receive the stem 36, prevents manifold pressure from being exerted on the valve disc 49.

Increase in the manifold pressure, caused by closing the gate G, therefore causes an increased pressure to be exerted on the sealed bellows 38, to contract its length. This movement draws the valve stem 36 to the right, and therefore replaces the discs 43 and 44 over the ports 53 and 54. Flow of the hydraulic fluid is accordingly arrested, and the valve G is fixed in position. Conversely, had the rotor A been turned to open the gate G, then the sleeve 34 would have been shifted to the left, and the diminution of manifold pressure would have permitted the bellows 38 to expand. The valve discs 43 and 44 would again have followed after the ports 53 and 54 to restore and maintain the balanced condition.

It is apparent that any condition causing a change in the manifold pressure is reflected by the extension or contraction of the bellows 38, with compatible readjustments of the valve mechanism in the unit B, and the positioning of the gate G. Regulation of the manifold discharge pressure, and its maintenance at a substantially constant value, is thereby effected.

Such regulation is not, however, necessarily instantaneous, because of the action of the bellows 37. Since both interior and exterior of this bellows are normally subjected to equal pressures, by reason of the vent 67, relatively slow or small changes in manifold pressure have no significant effect on the bellows 37. When rapid pressure changes tend to occur, as for example, during a power dive or steep climb, the rapid change in the pressure on the exterior of the bellows 37 creates a pressure differential, due to the restricting effect of the orifice 67. The bellows 37 will then tend to expand or collapse, as the case may be, and thereby add to or subtract from the force acting on the valve stem 36.

It will be noted that the bellows 37, which is sensitive to the rate of change of manifold pressure, effects a rapid adjustment of the valve unit 35 in anticipating the adjustments to be secured by the bellows 38. Thus, in a power dive, the manifold pressure increases, because of the rapid transfer to a region of denser air. The pressure increase operates to foreshorten the bellows 37, thus admitting pressure fluid through port 54 to chambers 21, to open the spill valve G, as previously described. As the pressures within and outside of the bellows 37 become equalized, by flow through the orifice 67, the bellows expands. In fact, due to the falling external pressure, caused by the opening of gate G, the bellows may actually be extended beyond its free length. By this time, however, the bellows 38 has taken a new position to govern the setting of the gate, and the combined assembly therefore works to meet a rapid pressure change with a rapid readjustment, followed by rapid dampening to prevent hunting of the valve 35.

*Pumping limit detector*

The pumping limit detector D is provided to supervise the performance of the units A, B and C, as just described, and it will be herein treated insofar as it forms an element of the combinations constituting a part of this invention.

The unit D comprises a cylindrical 71 provided with left and right hand chambers 72 and 73 of different diameters, and a central bore 74. The chamber 72 is divided into two parts by a diaphragm 75, the left hand part being connected to inlet pressure by a pipe 76 leading to the supercharger inlet 11. The right hand part is connected by a pipe 77 to the venturi 12. The diaphragm 75 is, therefore, subject to an unbalanced pressure proportionate to the pressure drop between the upstream and throat regions of the venturi, which pressure tends to force the diaphragm 75 to the right.

The right hand chamber 73 is divided into three sections by two spaced diaphragms 77a and 78. The middle chamber, between the two diaphragms, is subjected to inlet pressure by a conduit 79 leading to the pipe 76. The right hand section of the chamber 73 is connected to the supercharger discharge line 13 by a pipe 81, and to the left hand section by a duct 82. Thus, the same high pressure is applied in opposing directions of the diaphragms 77a and 78 against the relatively low resistance of inlet pressure in the space between the diaphragms.

The area of the diaphragm 78 is greater than that of the diaphragm 77a, but less than that of the left hand diaphragm 75. There is thus a resulting force which tends to push the diaphragms 77a and 78 toward the left. Interposed between the two chambers 72 and 73, and in the bore 74, is a valve unit whose stem 84 abuts both the diaphragms 75 and 77a. A centrally located valve disc 85 normally uncovers a port 86, which is connected to high pressure hydraulic fluid by a branch 87. The liquid is thus admitted to the clear space between the disc 85 and another disc 88, which space is connected to the pressure line 41 by a port 89. The previously described drain line 52 is coupled to a port 91 leading to the clear space between the disc 85 and a third disc 92, for connection to a port 93 in communication with the master drain line 94. Another drain line 95 leads through an additional port 96 to the clear space between the discs 85 and 88, to become effective when the valve assembly is pushed over to the left. At that time, the inlet line 87 is coupled to the line 52, while the master drain is connected to the line 41.

Any shifting of the valve stem 84 which makes the line 41 a drain, and the line 52 a pressure supply line, of course completely reverses the direction of application of force on the vane 19 of unit A, as heretofore described. In other words, the valve settings of unit D, under the normally existing pressure condition, make the line 41 a pressure line, whereby the units A, B and C regulate the setting of the gate G as formerly stated. When the settings are reversed, then the vane 19, instead of moving the gate G to a closed position, for example, will move it to an open position. The detector D may therefore completely nullify the natural inclination of the units A, B and C in actuating the valve G, and therefore, the supercharger discharge pressure.

The detector operates to overrule the waste gate regulator, and reverse its action, when the amount of delivered air is so small, with respect to the pressure rise, that the pumping limit of the supercharger is reached. Such a situation may arise under variation in the controlling factors heretofore discussed.

Referring again to the left hand chamber 72 of the unit D, it will be seen that the force exerted in the right hand direction, which tends to keep the main pressure line in communication with the line 41, is proportional to the working area of the diaphragm 75 and to the pressure drop from atmosphere to the Venturi throat 12. The pressure drop is in turn proportional to the mass, density of the air, and its velocity. Hence, the mean effective thrust on the left hand end of the valve stem 84 may be proportioned to the expression: $[\rho v^2]$. The left hand thrust is similarly proportioned to the pressure rise $(P_2-P_1)$, since the middle section of chamber 73 is connected to atmosphere, while the other faces of the differential diaphragms 77a and 78 are subjected to the supercharger discharge pressure.

Accordingly, under normal conditions of operation, or over that range of pressure quantity ratios within the pumping limit, the detector D permits admission of the hydraulic pressure fluid to the line 41. The units A, B and C then function as first described, the manifold pressure is regulated, and any excess air delivered at that pressure, which is not needed by the engine, passes to waste through the partially open spill valve G. When this relationship changes in such manner as to cause the supercharger S to approach its pumping limit, the gate G, rather than being turned to a closed position in the manner first outlined, will now be thrust toward an open position. The resulting reduction of discharge pressure head, by the relief of the compressed air, is reflected in the line 81 and on the diaphragms 77a and 78, as well as the bellows 37 and 38. Valve stem 84 may then move toward the right, restoring to line 41 its function as a pressure fluid supply line, and thereby making the unit B once more the control instrumentality. It will have been noted that the right hand face of the diaphragm 79 carries an evacuated bellows 97, which subtracts from the working area on that side, thereby making the unit D more sensitive and accurate in its operation.

It may be assumed that operation of the aircraft causing the detector D to cut in and out of service will be accompanied by other conditions observed by the pilot. He may then elect to shift the link 15 to the extreme right, thereby to open the gate G, manually, and he may moreover desire to throttle the engine to an even greater extent. For this purpose, the arm 16, connected to the link 15, is provided with a pin 101, to which is attached a rod 102 formed with a terminal slot 103. The slot receives a pin 104 connected to a linkage 105, which is connected in turn to a damper 106 pivoted in the manifold line 13. Normal back and forth motion of the rod 102 simply causes the pin 104 to ride in the slot 103. Under these conditions the damper 106 hangs wide open, and is not affected at all. However, if the link 15 is pulled to its extreme position, the end of the slot 103 engages the pin 104, pulling it along to close the damper 106, and thereby additionally throttle the engine. Restoration of the link 15 to a normal operating range permits the damper to open, restoring the control of the air supply to the units heretofore considered.

Supercharger drive control

The supercharger S is driven from the engine through a drive unit 112, which, as herein indicated includes fluid coupling members and gearing permitting the supercharger to run at one or the other of two speed ratios. Normally, the gearing will be set to drive in the low speed ratio. However, when high altitudes are encountered, it may be necessary to shift to the higher speed ratio, so that the supercharger may deliver an adequate quantity of air and still operate safely within the pumping limit. The particular drive just referred to is not the subject matter of this invention, and therefore, is not shown in detail. Here, the description is concerned with the control of the drive, and, since a fluid coupling is involved, the control means is made to govern the supply of hydraulic fluid to the coupling.

There are two hydraulic pressure fluid lines, 113, 114, which lead from the unit H to the coupling 112, and a main feeder 115 extends from the filter F to the unit H. When the feeder 115 is connected to the line 113, the unit 112 is in low speed, and, when the unit is actuated to couple the lines 115 and 114, the supercharger S is driven through the high speed ratio. Selection of the position of the unit H may be effected either manually, or automatically through the unit E. The unit E comprises a fixed cylindrical casing 121 having a movable follower 122 projecting from one end thereof, and held in engagement with a cam 123 on the rotor unit A by means of a spring 124, disposed in the casing 121 between its end wall and the inner end of the follower. A sealed bellows 125 is fixed to the free end of the follower 122, and it abuts a push pin 126 of an electric switch 127. The follower 122 is open to the atmosphere, and the bellows 125 is evacuated. Hence, atmospheric pressure tends to collapse the bellows and withdraw its inner end from engagement with the push pin 126. At higher altitudes the bellows will expand, due to the lower air density, and may do so even to a point where it can press the pin 126 sufficiently hard to snap the switch 127, everything else disregarded. Normally, the parts are so proportioned that, at sea level, the maximum lift of the cam 123, brought into play by rotation of unit A, is insufficient to offset the contraction of the bellows 125. As higher altitudes are reached, extension of the bellows 125 permits the actuation of the pin 126 at different settings of the cam 123, until finally a point is reached where actuation of the rotor A becomes unnecessary, as just pointed out. Thus, the switch 127 will snap at some predetermined altitude, established by the setting of the rotor A and the barometric pressure. Or, stated otherwise, each setting of the rotor A, by the manual lever 15, determines the altitude at which the supercharger may go into high speed.

The switch 127, as shown in the diagrammatic repetition in the drawings, is of a single pole, double throw type, wherein inward movement of the pin 126 forces the resiliently supported lever 128 into engagement with a high speed contact 129, while withdrawal of the pin 126 permits the lever 128 to move forward against a low speed contact 131. Manual control over the electrical circuit is obtained through a switch having a pivoted arm 133 which may be selectively set on an automatic control contact 134, a low speed contact 135, or a high speed contact 136. When the arm is in the position shown, the gearing 112 may be in either high or low ratio; when point 135 is used only a low ratio is available, and when point 136 is connected, the high speed ratio is selected, subject to certain limitations hereafter stated.

The circuits established by the settings of switches 133 and 127 (which will be traced directly) determine whether fluid will flow from line 115, through unit H, to line 113 or line 114. This unit comprises a housing 137 formed with a bore 138 in which is slidably mounted a valve member 139. The feeder line 115 connects to a port 141, communicating with the bore 138, while the lines 113 and 114 are respectively connected to axially spaced ports 142 and 143.

The valve member carries a series of spaced discs which serve to direct pressure fluid to the line 113 or 114, depending upon their relation to the port 141. The structure is so similar to the valves heretofore described that it is believed unnecessary to elaborate thereon. It may, however, be noted that the unit is formed with additional similar ports 145 which seem to re-open the feeder 115 to the line from which it otherwise would be blocked. This, however, is desirable, since the short-circuiting connection is taken through a restricted orifice, as shown. Admission of a limited amount of fluid to the blocked line 113 or 114 assures lubrication and cooling of the coupling then out of service, but the total flow is too small for power transmission purposes.

The valve member 139 has an extended stem 151 terminating in a clevis 152, the pin of which is positioned in a slot 153 of a lever 154, pivoted on a fulcrum 155. The opposite arm of the lever is formed with a fork 156, in which may ride a pin 157 extending from a rocker segment 158. The segment, which is centrally pivoted on a stud 159, carries a pair of links 161 at one corner, which extend to a plunger 162 of a solenoid 163. When the solenoid is energized, the plunger is pulled up, thereby to rotate the segment 158 into a substantially vertical position. As will presently appear, such movement simultaneously breaks the energizing circuit, permitting the plunger 162 to drop away. Due to the inertia of the moving parts, however, the segment does not fall back to its starting position, but continues its travel to the opposite upper quadrant from which it started. Thus, each energization of the solenoid shifts the pin 157 up or down.

This motion is transmitted through the lever 154 to shift the valve stem 151 either down or up, as the case may be. For example, the drawings show the links 161 in the second quadrant and the valve discs 144 so located as to supply pressure fluid to the low speed line 113. Upon energizing the solenoid 163, links 161 swing to the first quadrant, and stem 151 is pulled down to connect ports 141 and 143, thereby supplying high speed line 114, and blocking line 113 except for the reduced lubricating flow alluded to. On the next energization, the motion is reversed and the stem 151 is pushed up to restore it to the position illustrated.

The stem 151 carries spaced conductive discs 164 and 165, which respectively bridge either contacts 166 and 167 or contacts 168 and 169, depending upon the position of the valve. Contacts 166 and 168 are connected by a common wire 171 to the solenoid 163, the other side of which is grounded.

Let it be asumed that the machine has been running in the lower speed ratio, the parts of the solenoid valve unit H being as shown, and that the pin 126 has just been moved to force the switch arm 128 into engagement with the high speed contact 129, the switch arm 133 then contacting the automatic control point 134. A circuit for energizing the solenoid 163, thereby to shift the valve member 139, is now established as follows:

From the power source through arm 133, contact 134, wire 172 to arm 128 and high speed contact 129, thence via wire 173 and junction 174 to wire 175 into the armature 176 of a relay R, then engaging contact 177 connected to wire 178 leading to contact 167 on stem 151; thence through disc 164 to contact 166 and wire 171 to the winding of the solenoid 163, to ground and return. Plunger 162 is thereupon lifted to pull down the valve 139 as previously described, the disc 164 being separated from contacts 166 and 167 to break the circuit just traced when the links 161 aproach dead center. The disc 165 will accordingly engage contacts 168 and 169 when the parts have come to rest.

When the pin 126 is withdrawn, switch arm 128 engages low speed contact 131, and a reversal of the fluid connections, to restore the low speed ratio, is effected through the following circuit: From the power source to contact 131, wire 179, junction 181, wires 182 and 183, thence through disc 165 and contacts 168 and 169 to the solenoid 163.

Let it be assumed that the pilot selects the low speed contact 135 for the switch arm 133. Current then flows through contact 135 and wire 183 to contact 169, thereby to establish a circuit for low speed position of the unit H. If it be assumed that the high speed contact 136 is selected, the solenoid valve unit will (subject to a subsequently stated limitation) remain in the desired position, being actuated through the following circuit: Contact 136, wire 175, armature 176 and contact 177 of relay R, thence via wire 178 to contact 167, etc.

The relay R is introduced into the high speed circuit to enforce a low speed gearing when the compressed air in the delivery line 13 exceeds a predetermined temperature. The relay includes a coil 185, connected directly to the power source by a wire 186 and a wire 187 leading through a thermostatic switch 188 positioned in the pipe 13. Thus, the coil 185 will be energized whenever switch 188 closes at a predetermined temperature.

Armature 176 is then pulled down against the urge of its holding spring 189 to engage contact 191, which leads via wire 192 to junction 181, and so into the low speed selecting circuit.

The armature 176 is latched into this position by an armature 193 of a second coil 194, which must be energized to permit the armature 176 to return into engagement with contact 177, after the switch 188 has opened. A circuit for this coil is established by contacts 195 and 196, connected to the coil, and adapted to be bridged by a manually depressible switch arm 197.

It will thus be seen that the control of the supercharger speed ratio is quite flexible, the pilot may insist on a low ratio, or a high ratio subject to the thermostatic supervision; or he may let the ratio be determined automatically but still subject to his positioning of the rotor A.

*Engine regulation*

The engine of the power plant is supplied with air flowing past the damper 106, and fuel which is later mixed with such air. It is common in the art to include, with the engine, a proportioning device through which the relative percentages of fuel and air are determined and maintained. However, it is desirable to supervise the performance of such device in response to the manifold pressure, as determined by the instrumentalities heretofore considered. Thus, if the manifold pressure becomes either high or low, a rich mixture is indicated, while at intermediate pressures, the mixture may be lean.

Means for assuring the rich mixture are provided by the unit M, operating in conjunction with the manifold control unit A. The unit M comprises a valve casing 201 enclosing a spring loaded piston 202, whose stem 203 extends beyond the casing for connection to the carburetor controls, not shown.

The casing 201 also contains a bore 204 receiving a plunger 205, formed with a stem 206 which normally engages the dwell portion between two similar cams 207 on the rotor A. The bore 204 is formed with ports on either side of the plunger 205, one of which is connected by a pipe 208 to the main hydraulic feeder line 115. The other port is connected to a drain line, and it also communicates with the upper side of the piston 202 through a duct 209. Hydraulic pressure therefore urges the plunger 205 to the right, bringing the stem 206 into engagement with the periphery of the unit A.

The plunger 205 normally partially uncovers a port 211 below the piston 202, thereby enabling pressure fluid from the line 208 to urge the piston and its stem 203 upward. This position, by connection to any suitable linkage, sets the carburetor for operation in the usual manner. If, however, the rotor A is moved to either extreme position, the stem 206 rides up on one or the other of the cams 207, and moves to the left to block the line 208, and connect the port 211 to drainage. This permits the piston 202 to drop. If the rotor A is rapidly shifted from one extreme position to the other, the piston 202 will not, however, be significantly affected. This is due to the fact that the admission of pressure fluid through the port 211 is slow, in comparison to the drainage rate. Accordingly, the valve unit protects against sudden mixture changes which might be conducive to creating backfires. When the piston 202 drops, the corresponding movement of the stem 203 sets the carburetor unit in such position that only a rich fuel mixture can be supplied. Since the extreme movement of unit A corresponds to a high or low manifold pressure, the apparatus therefore achieves the purpose intended.

Under take-off conditions, a relatively high propeller, and engine, speed are desirable, while under flight conditions it may be better to decrease the speed. This can be done by changing the propeller pitch.

The unit L is therefore provided to adjust the propeller and engine speeds in response to the manifold pressure. The periphery of the rotor of unit A is formed with a milled cam slot 215, to which is connected a bellcrank lever 216, the upper arm of which is pivoted to a link 217. This link extends to a control mechanism 218 for a propeller governor speed control, the propeller being indicated by 219. Hence, an extreme movement of the rotor A, representing a high or low manifold pressure, will affect the propeller pitch, while in intermediate positions the inner end of the lever 216 is free to ride in the slot 215. The slot 215 is advantageously so cut as to insure a definite relationship between engine speed and manifold pressure—the curve being laid out from knowledge of the engine characteristics. In such case, intermediate settings of the rotor A cause the lever 216 to be positioned so as to follow the speed and pressure relationship.

It will thus be seen that the present invention provides an integrated control, automatic in operation, for the various components of the power plant, and accordingly relieves the pilot of the necessity of making a large number of independent adjustments. He is, however, free to supervise many such adjustments by his overriding manual controls, and he may therefore exercise his judgment with considerable latitude. The system is obviously directed to one wherein the supercharger is regulated by control of the discharge pressure, rather than by throttling the supercharger inlet, and any excess of air delivered at the predetermined pressure is accordingly sent to waste. Such plan of control admits of the simultaneous governing of the other related variables, as hereinabove explained.

*Supplemental disclosure on pumping limit control*

The equation $P_2-P_1=K\tfrac{1}{2}\rho v^2+K'P_2$, set forth on page 2 is derived from the equation:

$$P_2/P_1-1-K''=K'''\left(\frac{Q}{\sqrt{T_1}}\right)^2$$

in which $K''$ and $K'''$ are constants, $Q$ is the quantity of air in volume per unit of time supplied to the supercharger, $T_1$ is the absolute temperature of the entering air, $P_2$ is the pressure of the air discharged from the supercharger, and $P_1$ is the pressure of the entering air. I have discovered that, if a curve is plotted of $P_2/P_1$ against $Q/\sqrt{T_1}$ for pumping limit conditions, the last mentioned equation will approximately define this curve.

The first mentioned equation may also be reduced to a second form: $P_2-P_1=K^{IV}\rho v^2+K^V P_1$, in which $K^{IV}$ and $K^V$ are constants.

Some claims are based on the first equation and so refer to $P_2$ or the pressure of the gas delivered by the supercharger. Other claims are based on the second equation and so refer to $P_1$ or the pressure of the gas received by the supercharger.

For some conditions this curve can be expressed by the equation:

$$P_2/P_1-1=K^{VI}\left(\frac{Q}{\sqrt{T_1}}\right)^2$$

in which $K^{VI}$ is a constant. This equation will provide the equation: $P_2-P_1=K^{VII}\tfrac{1}{2}\rho V^2$, in which $K^{VII}$ is a constant.

For the pumping-limit control D of Fig. 1 the equation: $P_2-P_1=K\tfrac{1}{2}\rho V^2+K^1P_2$ is applicable for the exhausted bellows provides the correction designated by $K'P_2$.

In Fig. 2, there are shown a supercharger 218, an intake line 219, an outlet line 220, a line 221 leading to an engine, not shown, line 222 joined to lines 220 and 221, and a spill valve 223 in the line 222. A Pitot tube 224 mounted in the inlet line 219 is connected by a pipe 225 with a cylinder 226, in which is mounted a piston 227. A pipe 228 is connected to the pipe 225 and to a cylinder 229, in which is mounted a piston 230. The cylinder 229 is connected with a pipe 231, in turn connected with intake line 219. A connecting rod 232 attached to piston 230 is connected to one end of a lever 233 having a fulcrum 234 at a mid point. The other end of the lever 234 is connected to a connecting rod 235 attached to the piston 227. The lever 233 is connected with the spill valve 223 through a link 236 and a crank 237 fixed to the spill valve 223. The cylinder 226 is connected by a pipe 238 with a Pitot tube 239 in discharge line 220. The resultant force on the piston 227 is the difference between the pressures in the pipes 225 and 238, or the difference in pressures between the Pitot tubes 224 and 239. Pitot tube 224 measures the total pressure in the inlet line 219 or $P_1+\tfrac{1}{2}\rho_1 V_1^2$, ($P_1$, $\rho_1$, and $V_1$ being, respectively, pressure, mass density, and velocity of air or gas in the inlet line 219). Pitot tube 239 measures the total pressure in the discharge line 220 or $P_2+\frac{1}{2}\rho_2V_2^2$, ($P_2$, $\rho_2$, and $V_2$ being, respectively, pressure, mass density, and velocity of air or gas in the discharge line 220). The difference between these quantities is $\Delta P$ or the increase in pressure from inlet 219 to discharge 220 and is manifested in an upward thrust on piston 227. The resultant force on piston 230 is proportional to the difference in total pressures in the Pitot tube 224 and the pipe 231, since these parts are connected to opposite ends of the cylinder 229. The Pitot tube 224 is subjected to $P_1+\frac{1}{2}\rho_1V_1^2$, and the pipe 231, simply to $P_1$. The difference between these quantities is $\frac{1}{2}\rho_1V_1^2$, which is manifested as an upward thrust on piston 230. The forces $\Delta P$ and $\frac{1}{2}\rho_1V_1^2$ act in opposition to one another because of the pistons 227 and 230 through the connecting rods 235 and 232 to opposite ends of the lever 233. The diameters of the pistons 227 and the piston 230 are so proportioned, and the fulcrum 234 is so positioned between the ends of the lever 233 that the effective thrust of $\frac{1}{2}\rho_1V_1^2$ is magnified by a constant K dependent upon the characteristics of the supercharger. The force tending to hold the spill valve 223 closed is proportioned to $K\frac{1}{2}\rho_1V_1^2-\Delta P$, and the valve is open when $\Delta P$ becomes greater than $K\frac{1}{2}\rho_1V_1^2$. Thus measurement of the pumping limit of the supercharger 218 is based on the equation $\Delta P=K\frac{1}{2}\rho_1V_1^2$.

In the construction of Fig. 4 piston 230 in cylinder 229 is subjected to an upward thrust equal to $\frac{1}{2}\rho_1V_1^2$, since the lower end of cylinder 229 is connected to pipe 240, connected in turn to Pitot tube 224, subjected to $P_1+\frac{1}{2}\rho_1V_1^2$, and the upper end of cylinder is connected to pipe 231 subjected to $P_1$. However, piston 227 in cylinder 226 is subjected to a net upward thrust only approximately equal to $\Delta P$, since the upper and lower ends of the cylinder 226 are connected to pipes 241 and 242, connected, respectively, to inlet line 219 through pipe 231 and to discharge line 220 and subjected only to static pressures $P_1$ and $P_2$. However, the difference between $P_1$ and $P_2$ gives a sufficiently accurate $\Delta P$. As in Fig. 3, the spill valve 223 of Fig. 3 opens when $\Delta P$ becomes greater than $K\frac{1}{2}\rho_1V_1^2$. For Fig. 4 the measurement of the pumping limit is based on the equation $\Delta P=K\frac{1}{2}\rho_1V_1^2$.

In the construction of Fig. 5 a Venturi tube 243 is substituted for the pitot tube 224 of Figs. 3 and 4 and is connected with the upper end of cylinder 229 by pipe 244. The lower end of cylinder 229 is connected with intake line 219 by pipes 254 and 246. As in Figs. 3 and 4, the net upward thrust on piston 230 in Fig. 5 is $\frac{1}{2}\rho_1V_1^2$. The net upward thrust on position 227 is the difference between static pressure $P_1$ in inlet line 219, communicated to the upper end of the cylinder 226 by pipe 246, and static pressure $P_2$ in discharge line 220, communicated through pipe 242. As in the construction of Fig. 4, the $\Delta P$ represented by this difference in static pressures $P_1$ and $P_2$ is only approximately equal to the true pressure difference, but it is sufficiently accurate for the purposes of this application. As in Figs. 3 and 4, the valve 223 of Fig. 5 opens when $\Delta P$ becomes greater than $K\frac{1}{2}\rho_1V_1^2$. For Fig. 5 the measurement of the pumping limit is based on the equation $\Delta P=K\frac{1}{2}\rho_1V_1^2$.

The construction of Fig. 6 is similar to that of Fig. 3 except that a servo-motor or servo-mechanism 248 is introduced between the lever 233 and the spill valve 223. The servo-motor 248 is connected at one side to the lever 233 by a link 247 and at the other side by a link 249 to the crank 237 secured to the spill valve 223. The purpose of the servo-motor is to multiply the force $\Delta P-K\frac{1}{2}\rho_1V_1^2$ sufficiently to enable it to open the valve. The servo-motor may take any suitable form.

While the invention has been described with reference to one embodiment only, it will be apparent that numerous changes and modifications may be made without departure from the principles, or the scope of the following claims.

I claim:

1. The combination with a supercharger adapted to receive gas at one pressure and to deliver it at another greater pressure; of means for preventing the supercharger from exceeding the pumping limit, said means comprising means responsive to the velocity of the gas received by the supercharger, means responsive to increase in gas pressure effected by the supercharger, and means responsive to absolute pressure of the gas received by the supercharger, the three last mentioned means cooperating with one another to prevent exceeding of the pumping limit upon arising of a condition in which the increase in gas pressure is in a neighborhood of value equal to constant times the square of the velocity of the gas received by the supercharger plus a constant times the absolute pressure of the gas received by the supercharger.

2. The combination with a supercharger adapted to receive gas at one pressure and to deliver it at another greater pressure; of means for preventing the supercharger from exceeding the pumping limit, said means comprising means responsive to the velocity and density of the gas received by the supercharger, means responsive to increase in gas pressure effected by the supercharger, and means responsive to absolute pressure of the gas received by the supercharger, the three last mentioned means cooperating with one another to prevent exceeding of the pumping limit upon arising of a condition in which the increase in gas pressure is in a neighborhood of value equal to a constant times the square of the velocity of the gas received by the supercharger times the density of the gas received plus a constant times the absolute pressure of the gas received by the supercharger.

3. The combination with a supercharger adapted to receive gas at one pressure and to deliver it at another greater pressure; of means for reducing the pressure of the delivered gas to keep the supercharger within the pumping limit, said means being responsive to arising of a condition in which the increase in gas pressure effected by the supercharger is in a neighborhood of value equal to a constant times the square of the velocity of the gas received by the supercharger plus a constant times the absolute pressure of the gas received by the supercharger.

4. The combination with a supercharger adapted to receive gas at one pressure and to deliver it at another greater pressure; of means for reducing the pressure of the delivered gas to keep the supercharger within the pumping limit, said means being responsive to arising of a condition in which the increase in gas pressure effected by the supercharger is in a neighborhood of value equal to a constant times the square of the velocity of the gas received by the supercharger times the density of the gas received plus a constant times the absolute pressure of the gas received by the supercharger.

5. The combination with a supercharger adapted to receive gas at a certain pressure and to deliver it at a greater pressure, a line for the gas delivered by the supercharger, and a valve in the line for reducing the pressure of the delivered gas; of means for opening the valve to reduce the pressure of the delivered gas and thereby to keep the supercharger within the pumping limit, said means being responsive to arising of a condition in which the increase in gas pressure effected by the supercharger is in a neighborhood of a value equal to a constant times the square of the velocity of the gas received by the supercharger plus a constant times the absolute pressure of the gas received by the supercharger.

6. The combination with a supercharger adapted to receive gas at a certain pressure and to deliver it at a greater pressure, a line for the gas delivered by the supercharger, and a valve in the line for reducing the pressure of the delivered gas; of means for opening the valve to reduce the pressure of the delivered gas and thereby to keep the supercharger within the pumping limit, said means being responsive to arising of a condition in which the increase in gas pressure effected by the supercharger is in a neighborhood of value equal to a constant times the square of the velocity of the gas received by the supercharger times the density of the gas received plus a constant times the absolute pressure of the gas received by the supercharger.

7. The combination with a supercharger adapted to receive gas at one pressure and to deliver it at another greater pressure; of means keeping the supercharger within the pumping limit, said means being responsive to arising of a condition in which the increase in gas pressure effected by the supercharger is in a neighborhood of value equal to a constant times the square of the velocity of the gas received by the supercharger plus a constant times the absolute pressure of the gas received by the supercharger.

8. The combination with a supercharger adapted to receive gas at one pressure and to deliver it at another greater pressure; of means keeping the supercharger within the pumping limit, said means being responsive to arising of a condition in which the increase in gas pressure effected by the supercharger is in a neighborhood of value equal to a constant times the square of the velocity of the gas received by the supercharger times the density of the gas received plus a constant times the absolute pressure of the gas received by the supercharger.

9. In combination, a supercharger, an inlet line for gas to the supercharger, an outlet line for gas delivered by the supercharger, a spill valve connected with the outlet line, a first cylinder, a first piston mounted therein, a second cylinder, a second piston mounted therein, a first pitot-tube means positioned in the inlet line, a line connecting the first pitot-tube means with one end of the first cylinder, a line connected with the other end of the first cylinder and with the inlet line so as to be subject to static pressure of gas therein, a line connecting the first pitot-tube means with one end of the second cylinder, a second pitot-tube means positioned in the outlet line, a line connecting the other end of the second cylinder and the second pitot-tube means, a pivoted lever, means connecting the pistons with the lever, and means connecting the lever with the spill valve.

10. In combination, a supercharger, an inlet line for gas to the supercharger, an outlet line for gas delivered by the supercharger, a spill valve connected with the outlet line, a first cylinder, a first piston mounted therein, a second cylinder, a second piston mounted therein, a first pitot tube positioned in the inlet line, a line connecting the first pitot tube with one end of the first cylinder, a line connected with the other end of the first cylinder and with the inlet line so as to be subject to static pressure of gas therein, a line connecting one end of the second piston with the line between the first pitot tube and the said one end of the first piston, a second pitot tube positioned in the outlet line, a line connecting the other end of the second cylinder and the second pitot tube, a pivoted lever, means connecting the pistons with the lever, and means connecting the lever with the spill valve.

11. In combination, a supercharger, an inlet line for gas to the supercharger, an outlet line for gas delivered by the supercharger, a spill valve connected with the outlet line, a first cylinder, a first piston mounted therein, a second cylinder, a second piston mounted therein, a first pitot-tube means positioned in the inlet line, a line connecting the first pitot-tube means with one end of the first cylinder, a line connected with the other end of the first cylinder and with the inlet line so as to be subject to static pressure of gas therein, a line connecting the first pitot-tube means with one end of the second cylinder, a second pitot-tube means positioned in the outlet line, a line connecting the other end of the second cylinder and the second pitot-tube means, a pivoted lever, means connecting the pistons with the lever, and means connecting the lever with the spill valve and including a servo-motor.

12. In combination, a supercharger, an inlet line for gas to the supercharger, an outlet line for gas delivered by the supercharger, a spill valve connected with the outlet line, a first cylinder, a first piston mounted therein, a second cylinder, a second piston mounted therein, a first pitot tube positioned in the inlet line, a line connecting the first pitot tube with one end of the first cylinder, a line connected with the other end of the first cylinder and with the inlet line so as to be subject to static pressure of gas therein, a line connecting one end of the second piston with the line between the first pitot tube and the said one end of the first piston, a second pitot tube positioned in the outlet line, a line connecting the other end of the second cylinder and the second pitot tube, a pivoted lever, means connecting the pistons with the lever, and means connecting the lever with the spill valve and including a servo-motor.

13. The combination with a supercharger adapted to receive gas at one pressure and to deliver it at another greater pressure; of means for preventing the supercharger from exceeding the pumping limit, said means comprising means responsive to the velocity of the gas received by the supercharger, means responsive to increase in gas pressure effected by the supercharger, and means responsive to absolute pressure of the gas delivered by the supercharger, the three last mentioned means cooperating with one another to prevent exceeding of the pumping limit upon arising of a condition in which the increase in gas pressure is in a neighborhood of value equal to a constant times the square of the velocity of the gas received by the supercharger plus a constant times the pressure of the gas delivered by the supercharger.

14. The combination with a supercharger adapted to receive gas at one pressure and to deliver it at another greater pressure; of means for preventing the supercharger from exceeding the pumping limit, said means comprising means responsive to the velocity and density of the gas received by the supercharger, means responsive to increase in gas pressure effected by the supercharger, and means responsive to absolute pressure of the gas delivered by the supercharger, the three last mentioned means cooperating with one another to prevent exceeding of the pumping limit upon arising of a condition in which the increase in gas pressure is in a neighborhood of value equal to a constant times the square of the velocity of the gas received by the supercharger times the density of the gas received plus a constant times the absolute pressure of the gas delivered by the supercharger.

15. The combination with a supercharger adapted to receive gas at one pressure and to deliver it at another greater pressure; of means keeping the supercharger within the pumping limit, said means being responsive to arising of a condition in which the increase in gas pressure effected by the supercharger is in a neighborhood of value equal to a constant times the square of the velocity of the gas received by the supercharger plus a constant times the absolute pressure of the gas delivered by the supercharger.

16. The combination with a supercharger adapted to receive gas at one pressure and to deliver it at another greater pressure; of means keeping the supercharger within the pumping limit, said means responsive to arising of a condition in which the increase in gas pressure effected by the supercharger is in a neighborhood of value equal to a constant times the square of the velocity of the gas received by the supercharger times the density of the gas received plus a constant times the absolute pressure of the gas delivered by the supercharger.

DAVID M. BORDEN.